United States Patent [19]

Lambert

[11] Patent Number: 5,088,585
[45] Date of Patent: Feb. 18, 1992

[54] RETRACTABLE ROLLER BALL CARGO FLOOR SURFACE

[76] Inventor: William S. Lambert, 52 Tokalon Pl., Metairie, La. 70001

[21] Appl. No.: 554,024

[22] Filed: Jul. 17, 1990

[51] Int. Cl.⁵ .............................................. B65G 13/00
[52] U.S. Cl. ................................. 193/35 SS; 414/535
[58] Field of Search .................... 193/35 SS, 782; 414/535

[56] References Cited

U.S. PATENT DOCUMENTS 4,911,279  6/1990  Thorndyke ................... 414/535 X
4,930,612  3/1990  Thunissen ..................... 193/35 SS

FOREIGN PATENT DOCUMENTS 258125  7/1962  Australia ........................... 414/535

*Primary Examiner*—D. Glenn Dayoan
*Assistant Examiner*—Keith Dixon

[57] ABSTRACT

Routine hand-labor cargo processing is an integral component of world commerce. The present invention permits the incorporation in one-and-the-same freight floor surface of the capacity for near-instantaneous conversion from the traditional static norm to the fluidity of an appropriately-spaced roller ball floor surface constructed of a positively unfailing composition. This convertability aspect offers an incomparable cost reduction in both labor and equipment in the cargo handling field. This floor system allows for those transfer balls 20 to retract from and project above its floor surface at the will of the operator. In the optimum embodiment, a lattice-like interconnection of reciprocally sliding structural angles 24 mounted with a plurality of appropriately spaced elevating wedges 22 upon which hinge plate 16 lift wheels (ball bearings) 30 ascend and decend to swing the hinge plates 16 up and down, thus correspondingly projecting and retracting an equal number of mounted transfer balls 20 thru the floor level.

2 Claims, 2 Drawing Sheets

RETRACTABLE ROLLER BALL CARGO FLOOR SURFACE

BACKGROUND

1. Field of Invention:

The essence of this inovation is the provision of the hardware to permit instant conversion of a freight traffic floor surface to the effortless fluidity of a roller (Transfer) ball surface along with the instant revision of the surface back to the norm.

2. Description of Prior Art

To date, the so-called Transfer Ball is best detailed in the patent Rolling Member to Blaurock Oct. 18, 1988, and is a basic representation of the transfer ball portion of this invention. This is now considered an off-the-shelf product and, of course, no patent claim is made thereto. Those comparable surfaces involving rotatable spheres upon which cargo or freight is moved over appear to be permanently fixed in the raised position and appear to be of an intermediate nature in that they are utilized to move things upon but, by their state of being permanently upraised, are too unstable for travel by the prime carrier unit.

Those devices capable of allowing for the raising and lowering of the referenced transfer balls appear to also allow for what could be extremely expensive equipment and labor downtime by failure of its essential, prime component. I refer to patents, Conveyor System With Rollers and Plungers, U.S. Pat. No. 4,627,526, Masciarelli, Dec. 9, 1986, Conveyors, U.S. Pat. No. 4,036,345, Webb, July 19, 1977, and Conveyor System With Rollers and Plungers, U.S. Pat. No. 4,706,793, Masciarelli, Nov. 17, 1987. That most problematical component of these inventions is the bladder affair that is inflated and deflated by air to raise and lower the transfer balls. One might imagine the expensive downtime of a puncture caused by an object falling between the bladder and the surface it must have to push against to raise the balls. Further, consider the time to dismantle and submerge the bladder underwater in an effort to locate the air leak. The nature of an air bladder support cannot provide what would be called "positive" support as does the present invention. What is to prevent a weight-caused imbalance from unequal weight distribution and its detrimental effect in the form of disimilar transfer ball projection. To maintain the required continual lubrication of the moving parts of these prior art devices presents a very definite challenge to a user. A user must consider the effects of time and the elements causing hardening and cracking of that material composing the bladder. In short, the preceding state-of-the-art references cannot compare to the subject invention in problem avoidance and none of the remaining balance existing can be described as a convertible (or prime carrier) floor in the truest sense of the word.

OBJECTIVES AND ADVANTAGES

The instant invention would, in a typical situation, be utilized in tandem multiples. One illustrative embodiment or implementation would be in both the residential and commercial contents moving business. These subsurface transfer balls would be so approximately spaced as to accomodate the majority of the shapes and sizes of the bottom-most, or floor contact areas of that typical cargo. A regular moving trailer/van would park on a level city street-the plurality of transfer balls would be in the activated or raised, level configuration.

Complementary labor would move(by hand and/or hand truck), for example, an object of furniture out to the floor of the carrier trailer van. Transitory loading ramp or dock aside, once upon van floor, one individual could effortlessly push this piece say, to the far end of the van and repeat this procedure until all parcels are so accounted for. With a flip of a lever or switch, the transfer balls retract uniformly and this normal load/shipment is satisfactory situated. Any other normal securement measures are performed. Extending the example further, assume the load is to be taken to the mover's warehouse for a storage period. The van floor level and the (balled) dock level, intentionally equal, the entire normal load could be transferred by a single individual to any point in that warehouse that was so floored. To complete move to a final location, the foregoing procedure is simply reversed.

DESCRIPTION OF DRAWING REFERENCE NUMERALS

Figure 1:
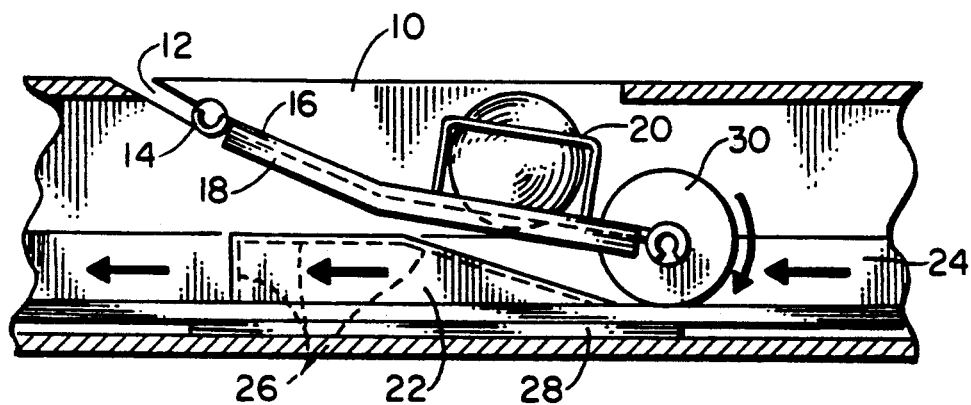
FIG. 1 is a side view of the transfer ball/hinge/plate in the retracted or lowered position.
Figure 2:
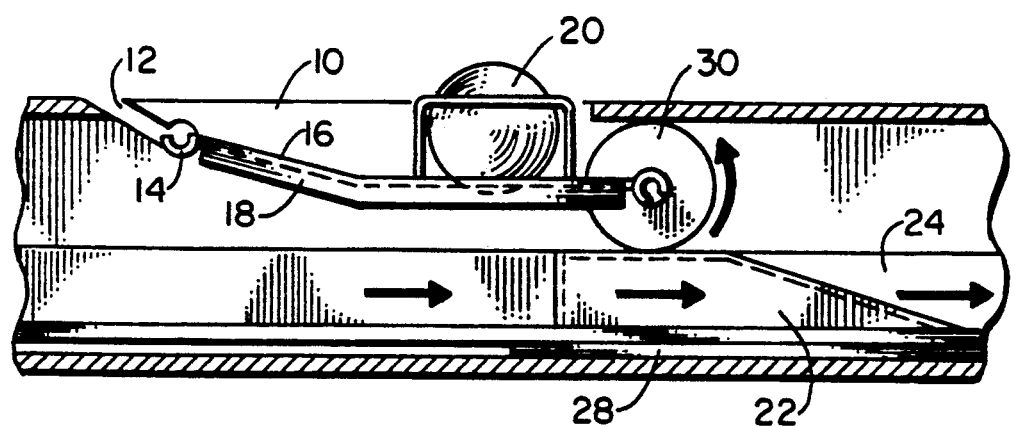
FIG. 2 is side view of the transfer ball/hinge/plate in the projected or raised position.

FIG. 1 represents the same Transfer Ball 20 both retracted and raised. Displayed in the optimum installation mode, inside square tubing.

10 is the (floor level) opening thru which the Transfer Ball 20 projects and retracts.

12 is the slide-in Slot sliced into the upper portion of the square tube to allow insertion of the Hinge Axles 14 of Hinge Plate 16 and by gravity is retained.

14 are the Hinge Axles stamp-formed from a portion of the Hinge Plate 16.

16 is the stamp-formed Hinge Plate and appurtenances.

18 is that portion of Hinge Plate 16 rolled-over 90o as perpendicular reinforcement of 16.

20 is the representation of a standard Transfer Ball and its retainer/collar attached to Hinge Plate 16.

22 indicates the Ball-Elevating Wedges, as welded to/across the Carriage Angles 24 and at all points of contact w/26.

24 Linear "slaved" Carriage Angles for multiple mounting of Wedges 22, allowing for simultaneous activation of lifting effect on all Transfer Balls 20

26 Elevating wedges 22 welded to Carriage Angles 24 at all contact points.

28 is Friction/Wear/Pads with Built-in lubricant.

30 Stamp-formed axles for/with mounted Lift Wheels (inner/outer race Ball Bearings in lieu of an actual wheel) with inner race pressed-on axle with axle overage spread-pressed to retain wheels.

12: Slide-in Slot for gravity-retained Hinge Axles 14.

14: Stamp-formed Hinge Axles.

16: Stamp-formed Hinge Plate.

18: Rolled-over material reinforcement skirt of 16.

20: Transfer Ball location.

30: Stamp-formed wheels (pressed-on ball bearings).

Figure 3:
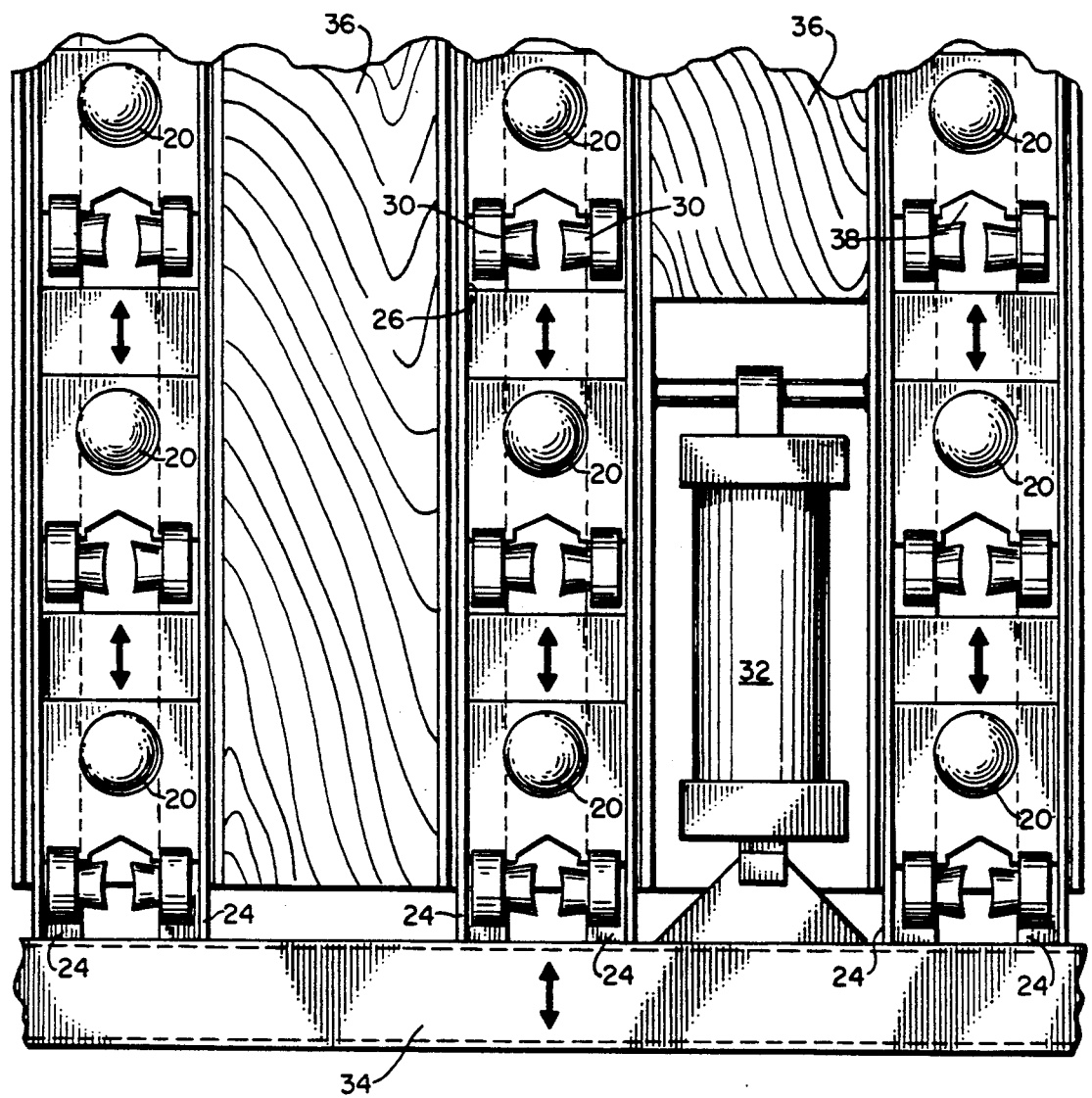
FIG. 3 is a top view of a portion of multiple rows of ball units in a floor layout.

FIG. 3—Top view of a portion of a floor layout.

24: Slaved Wedge Carriage Angles.

26: Wedges 22 welded to Carriage Angles 24 at all contacts.

30: Stamp-formed wheels (ball bearings pressed-on axles)

32: Weld-in insert/hydraulic cylinder (drives 22, 24, 26)

34: Push/Pull Bridle connecting 32 to 22, 24, 26.

36: Optional Hardwood alternating spacers.

38: Dirt/trash accumulation slots in Wedges 22 front and rear.

DESCRIPTION OF STRUCTURE

The plurality of Elevating Wedges 22 welded to and across (at all contact points of) the reciprocating (motively powered back and forth), lineally paired (slaved) Carriage Angles 24, the Lifting Wheels (ball bearings) 30 which they elevate, and the Hinge/Plate 16 upon which the Transfer Ball 20 (material composition dictated by use requirements) is mounted, constitute the essence of the instant invention. While this arrangement might be adapted for a multitude of conditions existing, totally new installations may accomodate those same type conditions, i.e., a steel, wood, or concrete dock-/deck, a freight floor of a truck/trailer van, a rail car floor, a ship, barge, or ship/container floor, an airplane freight floor, etc. As required amount of multiples, accommodatingly spaced and so housed in (so-called) square tubing, which are transversely secured by either a form of edge-to-edge weldments or joined by a required plurality of cross-bolting (avoiding interference with any moving parts). Some arrangements may dictate alternating square tubing and hardwood timber spacing. The optimum embodiment would seen to indeed be the square tubing. Structural capacity should at least exceed the P.S.I. capacity of the material-handling floor accomodated. Conceivably, a deck may be arranged in capacity/condition-dictated segments for optimum utility and power utilization.

The Hinge/Ball Plate 16 is secured on one end by the slide-in Slot 12 which receives the stamp-formed Hinge Axles 14 and the other, or wheeled (ball bearings) end 30 by the incline of the Wedge 22 as assisted by gravity and functions to elevate and retract the Transfer Ball 20 by riding up and down said incline 22.

The suggested optimum embodiment would be of steel construction, in more expensive grades for higher strength, stainless for special situations, aluminum for air freight, fiberglass for explosive enviorment, or of whatever material a situation might dictate. Available is an optional flexible dirt/trash cover of a mesh-reinforced material of maximum durability to attach over access hole 10 for Hinge/Ball/Plate 16 assembly with an opening for Ball 20 projection. Additional contamination protection of that portion of cubic area is available thru a compressible flexible foam insert for each assembly 20. While a considerable amount of dirt/trash may be brushed aside and then accumulate out of the way thru the slots 38 in the Wedges 22, an adequate evacuation hole for periodic flush-outs may be created in the bottom portion of the square tubing just beneath the Ball 20.

The spacing/location of (ganged) weld-in double-acting (push/pull) hydraulic cylinder inserts 32 to be per load requirements. Whatever the composition of the structure as a unit, it must accommodate internal (unto itself) hydraulic stresses and must include an automobile damage-prevention dump-off valve. Also, an automatic, "fail-safe" safety lock-down (balls 20 retracted) of system should activate except when in load/unload mode (balls projected). A movement/sensitive bee-bee in a capsule-type switch/alarm should compliment the arrangement to avoid cargo shifts. If may be beneficial to have the perimeter of floor openings 10 knurled upwardly to grab/bite the underside of cargo when balls are retracted. There should be removeable panels for access to hydraulic cylinders 32, bridle 2, 34 etc. The hydraulic cylinders 32 may be powered by a truck power/takeoff, a dock mounted source or even a manual hand pump for ship containers. If necessary, an opposed leaf or coil spring may compliment the hydraulics 32.

OPERATION OF INVENTION

The concurrent action of the Lifting Wheels (ball bearings) 30 "riding-up" the surface of the Ball Elevating Wedges 22 and the consequential elevation/projection of the Hinge Plate 16 and, thus the Transfer Balls 20 constitutes the heart of this proposed invention. The instantaneous conversion of an apparently static floor to the fluidity of a floor the surface of which is composed of a plurality of appropriately spaced (per cargo criterion) Transfer Balls 20 and, complementary reversion of the floor surface back to a static condition on demand.

As previously suggested, the method of implementation or adaptation in a given application (or floor/deck construction) must accommodate those prescriptive conditions, materials, and capacities. Again, the optimum embodiment/use would be as house in the joined, parallel assembly of so-called square tubing and, where applicable, complementary spacers (i.e., hardwood). This particular fabrication lends itself to rapid mass production techniques and would provide the maximum, inherent durability.

The operation of this convertible floor surface is best illustrated in the hypothetical: A hauling/transfer agent contracts for delivery and later retrieval of a trailer/van load of the typical American-type voting machines. These machines would be delivered to the various individual polling locations and, at the designated hours, are likewise consecutively retrieved and returned to a master location for vote tabulation/certification. Trailer-van floor and loading dock floors of equal elevation, the van operator using his own truck P.T.O. (hydraulic power takeoff) to mechanically activate/project the Transfer Balls 20 adequately above the (level) van floor surface. Assume also that the (level) loading dock surface is also convertible to an adequately balled surface.

This single driver may, with one handed ease, push each voting machine (weighing at least several hundred pounds) across that loading dock and into the interior of the van. In this manner, the driver is able to systematically and strategically complete this entire loading alone. A flip of a valve lever and the floors return to the static norm. Upon arrival to the designated (level) location, the Transfer Balls 20 are elevated, the drop-off made, Balls 20 retracted, and on to the next location. The process is reversed to collect these voting machines to a repository for certified tabulation. In short, this convertible floor allows (if the Union will) a single man to easily and rapidly accomplish the undertaking described. In lieu of voting machines, say, soft drink machines, refrigerators, etc., etc. This floor is most applicable to that class of freight/cargo that might be described as items low in physical profile and weighing in excess of several hundred pounds.

The entire floor acts as a single machine comprised of multiples of roller ball component units. The leading edge of the Ball Elevating (or Lifting) Wedges 22 attached to an supported by the appropriate (reciprocating) Carriage Angles 24 is forced under the minimally resistant (in effect, trailing) Lift Wheels (ball bearings) 30. The stamp-formed Hinge Plate 16 is leveraged upward thus projecting the Transfer Balls 20 sufficiently to form a pluralized fluid roller-ball floor surface. The cargo satisfactorily located, the sliding Carriage Angles 24 are mechanically withdrawn in the reverse direction and the wheels 30 roll down the Wedge 22 incline and the Hinge Plates 16 lower causing the Transfer Balls 20 to lower or retract and returning the floor surface to the static norm.

Conclusion

As obvious in the preceding text, despite other approaches to the matter, this proposed invention offers the surest, fail-safe, most positively solid, truly convertible system approach to expediting labor-oriented freight/cargo handling. The instaneous, simplistic conversion of a floor surface from the static norm to a (plurality of) roller ball(s) surface and/or back again is the very heart of this proposed innovation. The system can be cooperatively adapted to most proposed new construction of/and existing freight dock/decks. Its maintenance-free construction offers years of problem free use. Excluding cargoes necessitating individual extrinsic (lift-machine assists) lifting means, this floor system is capable of accommodating expedition of more than 75% of all cargo handled today.

I claim:

1. A freight floor surface capable of instantaneous conversion from a static norm to the fluidity comprising:

a plurality of roller assemblies pivotally mounted below the freight floor surface, each assembly comprising at least one load supporting retractable free rolling rotatable roller means mounted adjacent a free end of a pivotally mounted arm said assembly including a roller support means mounted adjacent said free end of said 2 arm: and a ramp means reciprocably supported beneath said roller assemblies for engagement with said roller support means to selectively cause pivitol movement of said assemblies between an upper position, wherein said roller means project above said floor surface and a lower position, wherein said roller assemblies are entirely below said floor surface.

2. The apparatus of claim 1, wherein said roller means is a transfer ball.

* * * * *